(12) United States Patent
Ishizu

(10) Patent No.: US 9,036,194 B2
(45) Date of Patent: May 19, 2015

(54) OPERATION INPUT APPARATUS, IMAGE FORMING SYSTEM, AND STORAGE MEDIUM FOR OPERATION INPUT PROGRAM

(71) Applicant: KYOCERA Document Solutions Inc., Osaka-shi, Osaka (JP)

(72) Inventor: Ryuichi Ishizu, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/260,207

(22) Filed: Apr. 23, 2014

(65) Prior Publication Data
US 2014/0320914 A1 Oct. 30, 2014

(30) Foreign Application Priority Data
Apr. 24, 2013 (JP) ................................. 2013-091827

(51) Int. Cl.
*G06F 15/00* (2006.01)
*G06K 15/02* (2006.01)
*G06F 3/12* (2006.01)
*G06F 3/048* (2013.01)

(52) U.S. Cl.
CPC ........ *G06K 15/1805* (2013.01); *G06K 15/1806* (2013.01); *G06F 3/1253* (2013.01); *G06F 3/1205* (2013.01); *G06F 3/1292* (2013.01); *G06F 3/048* (2013.01)

(58) Field of Classification Search
USPC ........................................................ 358/1.15
See application file for complete search history.

(56) References Cited

U.S. PATENT DOCUMENTS
2012/0019858 A1* 1/2012 Sato ............................ 358/1.15

FOREIGN PATENT DOCUMENTS
JP 2012029164 A 2/2012

* cited by examiner

*Primary Examiner* — Saeid Ebrahimi Dehkord
(74) *Attorney, Agent, or Firm* — Alleman Hall McCoy Russell & Tuttle LLP

(57) ABSTRACT

An operation input apparatus includes an imaging portion, an apparatus identifying portion, a recognizing portion, a display portion, and an operation input portion. The imaging portion is configured to be able to image an image forming apparatus installed in an installation location. The apparatus identifying portion identifies the image forming apparatus imaged by the imaging portion, based on specific identification information. The recognizing portion recognizes, by image recognition, the imaged image forming apparatus, according to the identification by the apparatus identifying portion. The display portion adds selection enabling information that enables a selection operation to the imaged image forming apparatus, based on the image recognition by the recognizing portion, and displays the image forming apparatus with the selection enabling information on a screen. The operation input portion receives an operation input to the image forming apparatus, according to a selection operation performed on the image forming apparatus on the screen.

17 Claims, 7 Drawing Sheets

OPERATION INPUT APPARATUS, IMAGE FORMING SYSTEM, AND STORAGE MEDIUM FOR OPERATION INPUT PROGRAM

INCORPORATION BY REFERENCE

This application is based upon and claims the benefit of priority from the corresponding Japanese Patent Application No. 2013-091827 filed on Apr. 24, 2013, the entire contents of which are incorporated herein by reference.

BACKGROUND

The present disclosure relates to an operation input apparatus that allows an operation input to an image forming apparatus, an image forming system, and a storage medium for an operation input program.

As a conventional operation input apparatus, a mobile terminal has been known which displays status information of an image forming apparatus by utilizing AR (Augmented Reality).

This mobile terminal includes an imaging portion. In the mobile terminal, when an image forming apparatus such as a printer, a copy machine, or a multifunction peripheral thereof, installed on a floor or the like, is imaged by the imaging portion, the imaged image forming apparatus and status information indicating whether or not the image forming apparatus is ready for printing are displayed on a screen. Thereby, a user can intuitively know the status of the image forming apparatus.

Further, in the mobile terminal, when the status information of the image forming apparatus is selected on the screen, an operation panel of the image forming apparatus is displayed on the screen to receive an operation input via the operation panel on the screen. Therefore, the user can perform an operation input to the imaged image forming apparatus.

SUMMARY

An operation input apparatus according to an aspect of the present disclosure includes an imaging portion, an apparatus identifying portion, a recognizing portion, a display portion, and an operation input portion. The imaging portion is configured to be able to image an image forming apparatus installed in an installation location. The apparatus identifying portion identifies the image forming apparatus imaged by the imaging portion, based on specific identification information. The recognizing portion recognizes, by image recognition, the imaged image forming apparatus, according to the identification by the apparatus identifying portion. The display portion adds selection enabling information that enables a selection operation to the imaged image forming apparatus, based on the image recognition by the recognizing portion, and displays the image forming apparatus with the selection enabling information on a screen. The operation input portion receives an operation input to the image forming apparatus, according to a selection operation performed on the image forming apparatus on the screen.

An image forming system according to another aspect of the present disclosure includes the above-mentioned operation input apparatus, and an image forming apparatus as an object to be imaged by the operation input apparatus.

A storage medium according to still another aspect of the present disclosure is non-transitory and computer-readable. The storage medium stores therein an operation input program that causes a computer to realize an imaging function, an apparatus identifying function, a recognizing function, a display function, and an operation input function. The imaging function is capable of imaging an image forming apparatus installed in an installation location. The apparatus identifying function identifies the image forming apparatus imaged by the imaging function, based on specific identification information. The recognizing function recognizes, by image recognition, the imaged image forming apparatus, according to the identification by the apparatus identifying function. The display function adds selection enabling information that enables a selection operation to the imaged image forming apparatus, based on the image recognition by the recognizing function, and displays the image forming apparatus with the selection enabling information on a screen. The operation input function receives an operation input to the image forming apparatus, according to a selection operation performed on the image forming apparatus on the screen.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An object to perform an intuitive operation input to an imaged image forming apparatus is realized by imaging the image forming apparatus installed in an installation location, and displaying the imaged image forming apparatus on a screen so as to allow a selection operation on the image forming apparatus.

Hereinafter, an embodiment of the present disclosure will be described with reference to the drawings.

[Configuration of Image Forming System]

Figure 1:
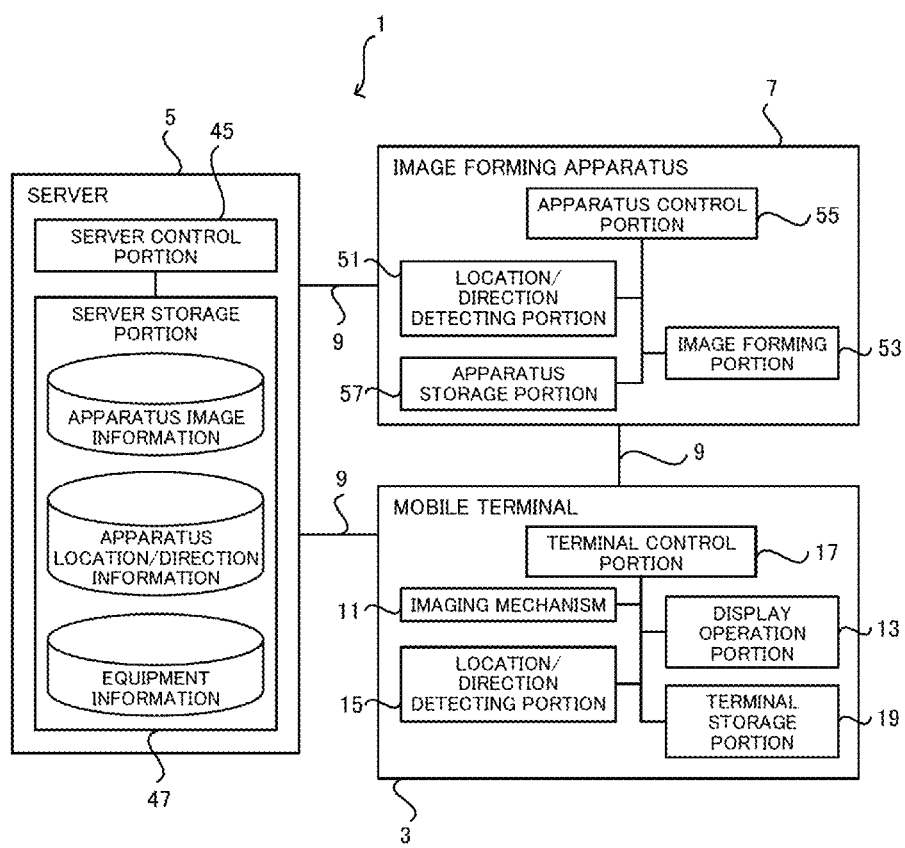
FIG. 1 is a block diagram showing the configuration of an image forming system having a mobile terminal according to an embodiment of the present disclosure.

As shown in FIG. 1, an image forming system 1 includes a mobile terminal 3 as an operation input apparatus, a server 5, and an image forming apparatus 7 which are connected in a communicable manner via a network 9. Although the image forming system 1 includes the single image forming apparatus 7 in FIG. 1, the image forming system 1 may include a plurality of image forming apparatuses 7.

In the image forming system 1 of the present embodiment, the image forming apparatus 7 installed in an installation location is imaged by the mobile terminal 3, and the imaged image forming apparatus 7 is displayed on a screen of the mobile terminal 3, based on information provided from the server 5, so as to allow a selection operation on the image forming apparatus 7. Thereby, the mobile terminal 3 receives an operation input for an image formation instruction or setting for the image formation through a selection operation performed on the image forming apparatus 7, and finally, can execute the image formation instruction on the image forming apparatus 7.

[Mobile Terminal]

The mobile terminal 3 is, for example, a personal digital assistant or a smartphone, and includes an imaging mechanism 11, a display operation portion 13, a location/direction detecting portion 15, a terminal control portion 17, and a terminal storage portion 19 (storage medium).

The imaging mechanism 11 is composed of, for example, a CCD (Charge Coupled Device) camera or a CMOS (Complementary Metal Oxide Semiconductor) camera, and is capable of imaging the image forming apparatus 7 installed in the installation location.

The display operation portion 13 includes a touch panel type screen, and allows an operation input to the mobile terminal 3, display of an operation status, and the like. The display operation portion 13 of the present embodiment displays the image forming apparatus 7 imaged by the imaging mechanism 11 so as to allow a selection operation on the image forming apparatus 7. The detail thereof will be described later.

The location/direction detecting portion 15 detects the location (coordinates) and the direction of the mobile terminal 3. The coordinates of the mobile terminal 3 can be detected by utilizing a GPS (Global Positioning System) or the like, and the direction of the mobile terminal 3 can be detected by utilizing a stand-alone positioning technique using a gyro sensor and an acceleration sensor in combination, or the like.

The terminal control portion 17 is a calculation device such as a CPU (Central Processing Unit), and controls each portion in the mobile terminal 3. The terminal storage portion 19 includes storage devices such as a ROM (Read Only Memory) in which various control programs are stored, a RAM (Random Access Memory) serving as a working area, and an HDD (Hard Disk Drive).

Figure 2:
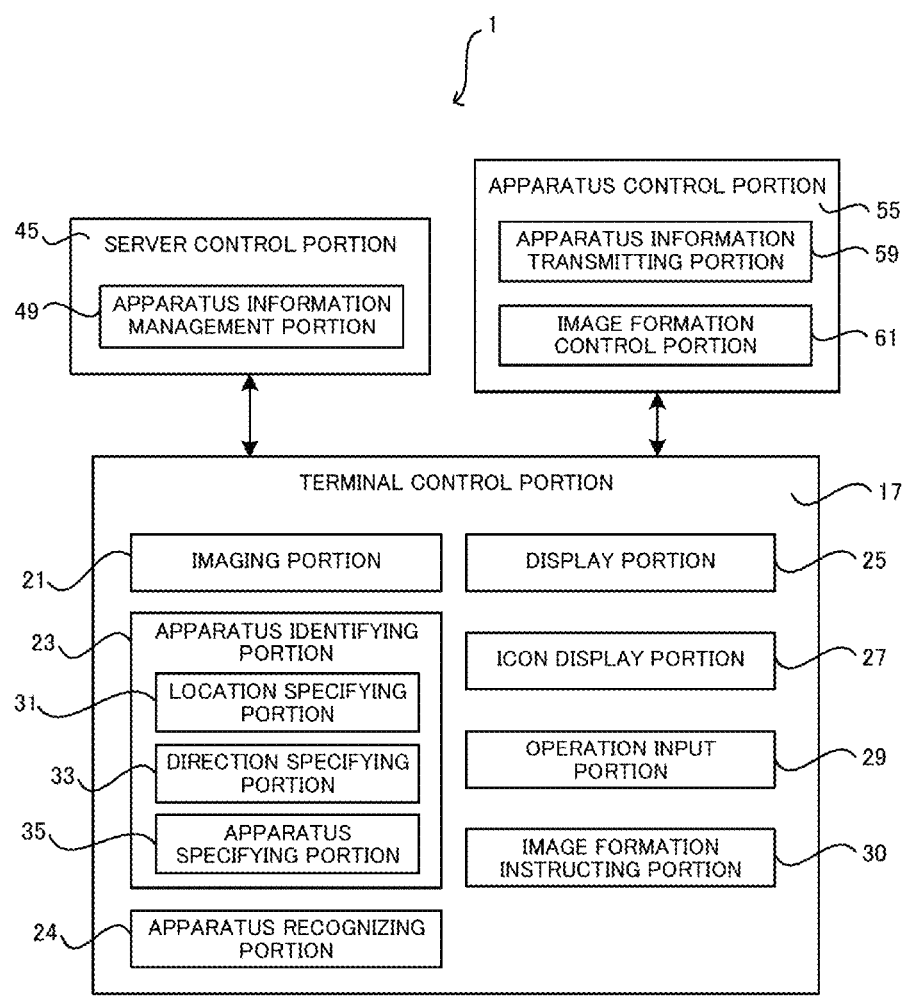
FIG. 2 is a functional block diagram of the image forming system shown in FIG. 1.

An operation input program of the present embodiment is stored in the terminal storage portion 19. The terminal control portion 17 executes the operation input program to act as an imaging portion 21, an apparatus identifying portion 23, an apparatus recognizing portion 24 (recognizing portion), a display portion 25, an icon display portion 27, an operation input portion 29, and an image formation instructing portion 30 which are shown in FIG. 2.

The imaging portion 21 realizes an imaging function, and causes the imaging mechanism 11 to image the image forming apparatus 7.

The apparatus identifying portion 23 realizes an apparatus identifying function, and identifies the imaged image forming apparatus 7 based on identification information. The apparatus identifying portion 23 of the present embodiment includes a location specifying portion 31, a direction specifying portion 33, and an apparatus specifying portion 35.

The location specifying portion 31 realizes a location specifying function, and acquires the location of the mobile terminal 3 from the location/direction detecting portion 15 (FIG. 1) and specifies the location. The direction specifying portion 33 realizes a direction specifying function, and acquires the direction of the mobile terminal 3 from the location/direction detecting portion 15 and specifies the direction.

The apparatus specifying portion 35 realizes an apparatus specifying function, and specifies the imaged image forming apparatus 7. Specifically, the apparatus specifying portion 35 transmits the specified location information and direction information of the mobile terminal 3 to the server 5, and receives apparatus location/direction information of the image forming apparatus 7 installed around the mobile terminal 3. The apparatus location/direction information is information indicating the installation location (coordinates) and the direction of the image forming apparatus 7. Using, as identification information, the apparatus location/direction information of the image forming apparatus 7 as well as the location information and the direction information of the mobile terminal 3, the apparatus specifying portion 35 identifies and specifies the imaged image forming apparatus 7.

The apparatus recognizing portion 24 realizes a recognizing function, and recognizes, by image recognition, the imaged image forming apparatus 7 according to the identification by the apparatus identifying portion 23. The image recognition is performed based on apparatus image information of the image forming apparatus 7, which is acquired from the server 5. The apparatus image information is information indicating the shape of the image forming apparatus 7 and the positions, shapes, ranges and the like of portions of the image forming apparatus 7. The apparatus recognizing portion 24 recognizes and specifies the imaged image forming apparatus 7 and the shapes and the regions of the portions thereof, by performing matching with the apparatus image information. The portions of the image forming apparatus 7 are portions having different functions such as a sheet feed stage as a sheet feed source and a sheet discharge tray as a sheet discharge destination, for example.

The apparatus image information can be acquired by receiving it together with the apparatus location/direction information of the image forming apparatus 7. A plurality of pieces of information corresponding to a plurality of directions of the image forming apparatus 7, such as a front face and side faces, are stored in the server 5 in advance, and information according to the direction of the mobile terminal 3 is selected from among the pieces of information, as the apparatus image information to be acquired.

In the image recognition, it is possible to improve the recognizability of each portion by providing the image forming apparatus 7 with a marker. In this case, information indicating the marker may be included in the apparatus image information.

The display portion 25 realizes a display function, and displays, based on the image recognition, the imaged image forming apparatus 7 and the portions thereof so as to be selectable, on the screen of the display operation portion 13. Specifically, the display portion 25 adds, to the image forming apparatus 7 and the portions thereof which are recognized by the apparatus recognizing portion 24, objects (selection enabling information) that enable selection operations on the screen of the display operation portion 13.

The icon display portion 27 realizes an icon display function, and displays an icon of data of an image formation object, so as to be movable, on the screen of the display operation portion 13. Display of the icon may be performed through, but not particularly limited to, menu selection or the like on the mobile terminal 3.

The operation input portion 29 realizes an operation input function. The operation input portion 29 allows a selection operation on the imaged image forming apparatus 7 on the screen of the display operation portion 13, and receives an operation input. The operation input to be received is an image formation instruction, setting, or the like.

Receivable image formation setting is determined based on equipment information of the image forming apparatus 7, which is provided from the server 5. The equipment information is information about functions and the like of the image forming apparatus 7, and the operation input portion 29 allows settings of the image forming apparatus 7 and the portions thereof within the ranges of the functions thereof. The equipment information is acquired by being received together with the apparatus location/direction information of the image forming apparatus 7.

The operation input portion 29 of the present embodiment allows different operation inputs according to different selection operations. For example, the operation input portion 29 allows image formation instructions and settings, according to different selection operations such as "tap", "drag and drop", "flick" and the like. FIGS. 3A to 3C and FIG. 4 show examples of operation input screens.

Figure 3A:
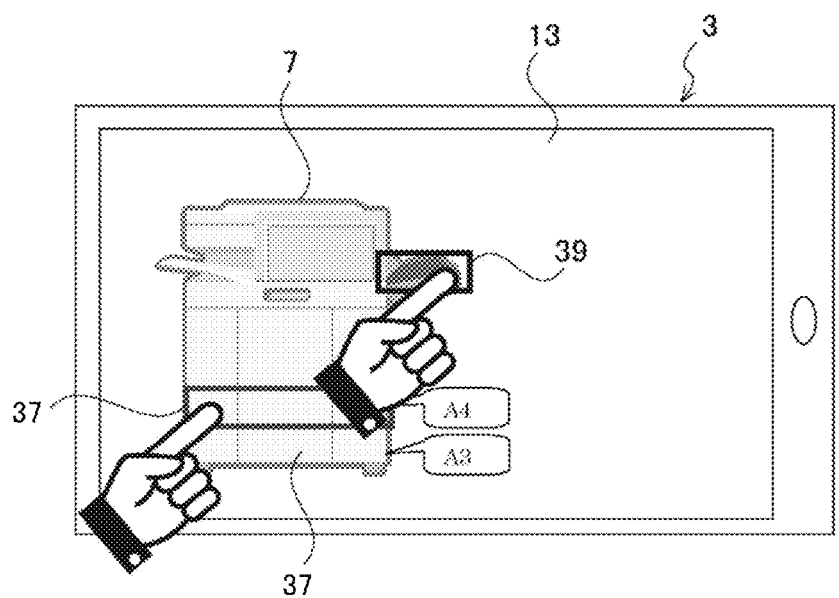
FIGS. 3A, 3B, and 3C are diagrams each showing an example of an operation input screen of the mobile terminal shown in FIG. 1.
Figure 3B:
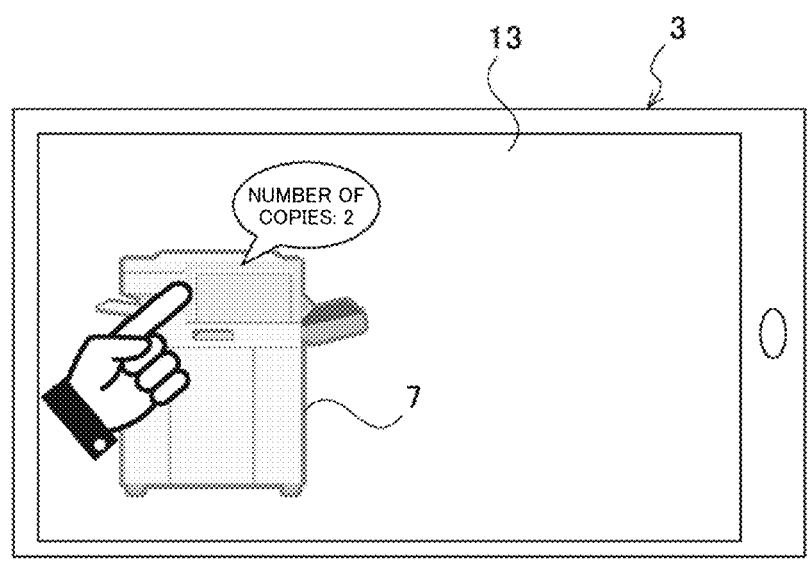
Figure 3C:
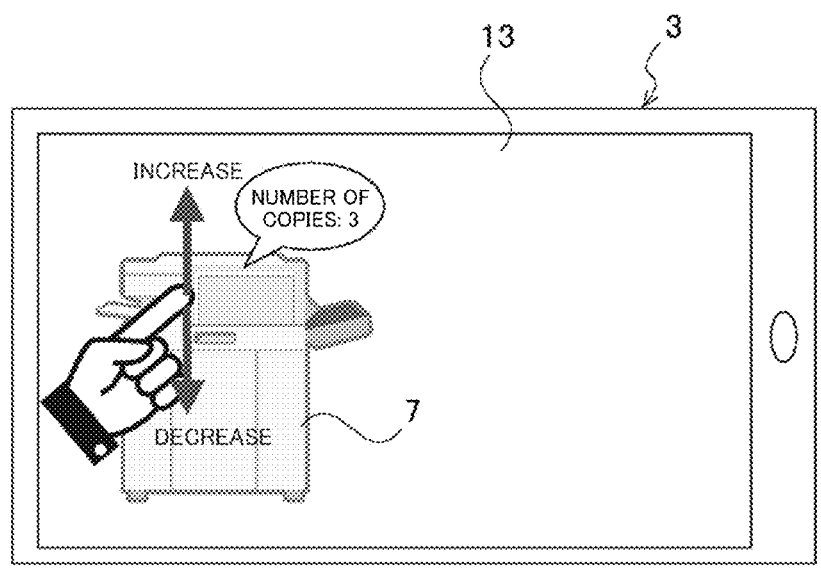
Figure 4:
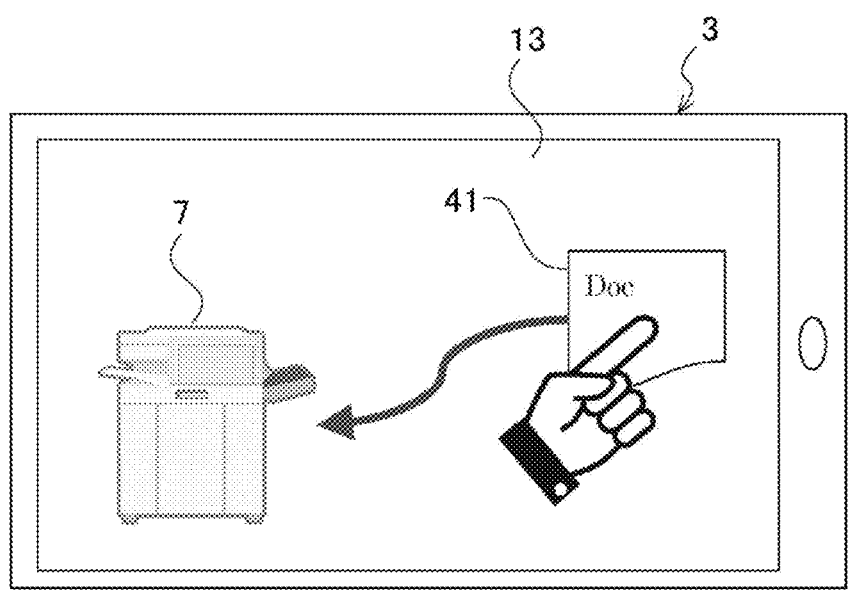
FIG. 4 is a diagram showing an example of an operation input screen of the mobile terminal shown in FIG. 1.

FIGS. 3A, 3B, and 3C show examples of operation input screens when image formation settings are performed. FIG. 4 is an example of an operation input screen on which an image formation instruction is made.

In the example of FIG. 3A, on the display operation portion 13 of the mobile terminal 3, a sheet feed source 37 and a sheet discharge destination 39 of the image forming apparatus 7 are designated by a selection operation by tapping. In the example of FIG. 3B, the number of copies for image formation is designated by a selection operation by tapping the image forming apparatus 7 itself. In the example of FIG. 3C, the number of copies designated as shown in FIG. 3B is changed by a selection operation by vertically flicking the image forming apparatus 7 itself.

In the example of FIG. 4, a selection operation is allowed in which an icon 41 of data of an image formation object is overlapped with the image forming apparatus 7 by dragging and dropping the icon 41, and thus an image formation instruction for the data corresponding to the icon 41 is made.

The operation inputs are not limited to the examples shown in FIGS. 3A, 3B, 3C, and 4.

The image formation instructing portion 30 realizes an image formation instructing function, and executes the image formation instruction according to the operation input to the operation input portion 29. Specifically, when image formation setting is performed on the operation input portion 29, the image formation setting is stored in the RAM or the like of the terminal storage portion 19. When an image formation instruction is made, the image formation instruction is executed according to the image formation setting and the data of the image formation object.

[Server]

The server 5 is an AR server, and includes a server control portion 45 and a server storage portion 47 as shown in FIG. 1. The server control portion 45 is a calculation device such as a CPU, for controlling each portion. The server storage portion 47 includes storage devices such as a ROM, a RAM, and an HDD, for storing therein an operation control program and the like.

The server 5 of the present embodiment stores, in the server storage portion 47, the apparatus location/direction information, the apparatus image information, the equipment information, and the like of the image forming apparatus 7, and transmits these pieces of information to the mobile terminal 3. Therefore, the server control portion 45, executing a program in the server storage portion 47, acts as an apparatus information management portion 49 as shown in FIG. 2.

The apparatus information management portion 49 realizes an apparatus information management function, and manages apparatus information of the image forming apparatus 7, such as the apparatus location/direction information, the apparatus image information, and the equipment information. Upon receiving the location information and the direction information from the mobile terminal 3, the apparatus information management portion 49 transmits, based on these pieces of information, the apparatus information of the image forming apparatus 7 existing around the mobile terminal 3, to the mobile terminal 3.

When transmitting the apparatus information, the apparatus information management portion 49 specifies the image forming apparatus 7 existing around the mobile terminal 3, based on the location information and the direction information from the mobile terminal 3, and creates a list including the apparatus location/direction information of the specified image forming apparatus 7. The apparatus information management portion 49 transmits, together with this list, the apparatus image information and the equipment information of the image forming apparatus 7 in the list, to the mobile terminal 3.

[Image Forming Apparatus]

The image forming apparatus 7 shown in FIG. 1 includes, for example, a printer, a copy machine, or a multifunction peripheral thereof. The image forming apparatus 7 of the present embodiment performs image formation (printing) based on an image formation instruction from the mobile terminal 3, and includes a location/direction detecting portion 51, an image forming portion 53, an apparatus control portion 55, and an apparatus storage portion 57.

The location/direction detecting portion 51 detects the location (coordinates) and the direction of the image forming apparatus 7. The location of the image forming apparatus 7 can be detected by utilizing a GPS or the like, like the mobile terminal 3. The direction of the image forming apparatus 7 can be detected by utilizing a geomagnetic sensor or the like.

The image forming portion 53 is a print engine or the like, and performs image formation on paper sheets, based on input image formation data.

The apparatus control portion 55 is a calculation device such as a CPU, for controlling each portion. The apparatus storage portion 57 includes storage devices such as a ROM, a RAM, and an HDD, for storing therein an operation control program and the like. In the present embodiment, the apparatus control portion 55, executing a program in the apparatus storage portion 57, acts as an apparatus information transmitting portion 59 and an image formation control portion 61 as shown in FIG. 2.

The apparatus information transmitting portion 59 realizes an apparatus information transmitting function, and transmits, to the server 5, equipment information of the image forming apparatus 7 as well as location information and direction information of the image forming apparatus 7 which are detected by the location/direction detecting portion 51. The location information and the direction information are managed as the apparatus location/direction information.

The image formation control portion 61 generates image formation data to be output, based on the image formation instruction from the mobile terminal 3. The generated image formation data is transferred to the image forming portion 53, wherein image formation on paper sheets is performed.

[Operation Input Processing]

Figure 5:
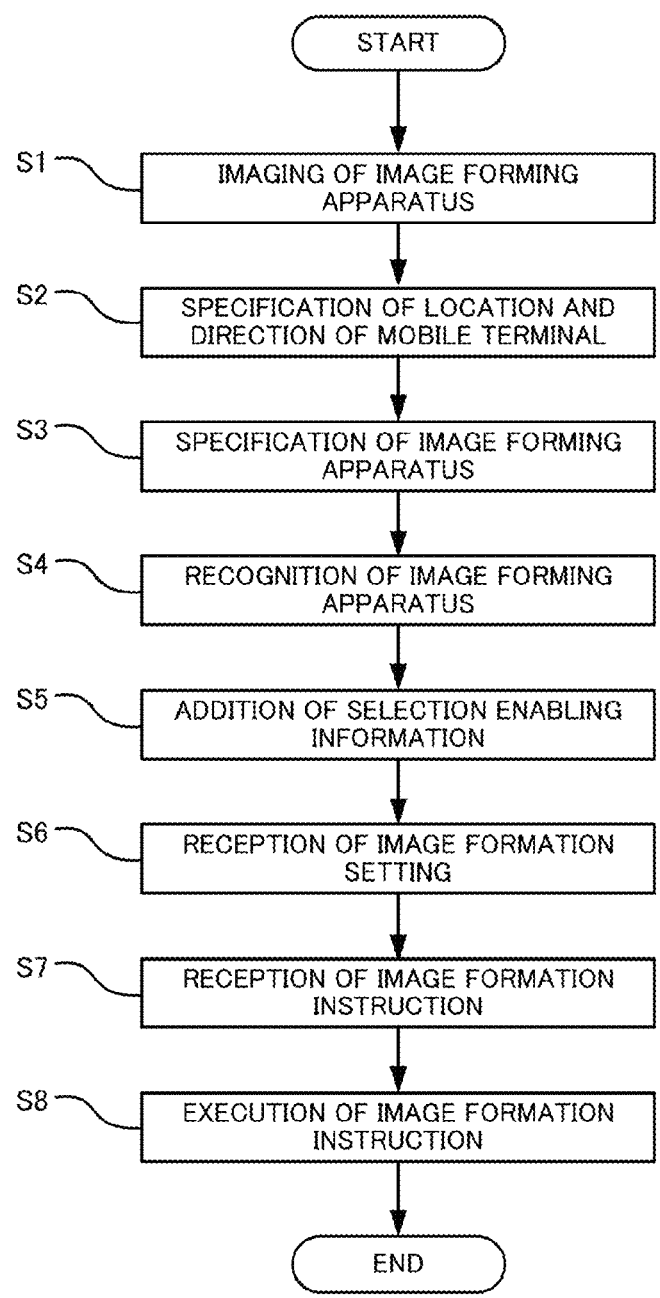
FIG. 5 is a flowchart showing operation input processing executed by the mobile terminal shown in FIG. 1.

FIG. 5 is a flowchart showing operation input processing.

The operation input processing of the present embodiment is started when the operation input program is executed in the mobile terminal 3.

In step S1, "imaging of image forming apparatus" is performed. Specifically, a user holding the mobile terminal 3 places the image forming apparatus 7 installed in an installation location, at a position within an imaging range of the imaging mechanism 11 of the mobile terminal 3. Thereby, in the mobile terminal 3, the terminal control portion 17 acts as the imaging portion 21, and the imaging mechanism 11 images the image forming apparatus 7.

Thus, step S1 is completed, and the processing shifts to step S2.

In step S2, "specification of location and direction of mobile terminal" is performed. Specifically, the terminal control portion 17 of the mobile terminal 3 acts as the location specifying portion 31 and the direction specifying portion 33 of the apparatus identifying portion 23, and acquires the location information and the direction information of the mobile terminal 3 from the location/direction detecting portion 15. The location and the direction of the mobile terminal 3 are specified based on the above information.

Thus, step S2 is completed, and the processing shifts to step S3.

In step S3, "specification of image forming apparatus" is performed. Specifically, the terminal control portion 17 of the mobile terminal 3 acts as the apparatus specifying portion 35 of the apparatus identifying portion 23, and transmits, to the server 5, the specified location and direction of the mobile terminal 3. Then, based on the received apparatus location/direction information of the image forming apparatus 7 and the location information and the direction information of the mobile terminal 3, the apparatus specifying portion 35 identifies and specifies the imaged image forming apparatus 7.

Thus, step S3 is completed, and the processing shifts to step S4.

In step S4, "recognition of image forming apparatus" is performed. In step S4, the terminal control portion 17 of the mobile terminal 3 acts as the apparatus recognizing portion 24, and recognizes, by image recognition, the imaged image forming apparatus 7 according to the identification in step S3.

Specifically, matching is performed between the image forming apparatus 7 identified in step S3 and the apparatus image information indicating the shape of the image forming apparatus 7, and the positions, shapes, ranges and the like of the portions thereof. When the imaged image forming apparatus 7 and the shapes and regions of the portions thereof are recognized and specified by the matching, the processing shifts to step S5.

In step S5, "addition of selection enabling information" is performed. In step S5, the terminal control portion 17 of the mobile terminal 3 acts as the display portion 25, and adds selectable objects to the imaged image forming apparatus 7 and the portions thereof, based on the image recognition in step S4. The image forming apparatus 7 and the portions thereof, to which the objects are added, are displayed on the screen of the display operation portion 13.

Thus, step S5 is completed, and the processing shifts to step S6.

In step S6, "reception of image formation setting" is performed. In step S6, the terminal control portion 17 of the mobile terminal 3 acts as the operation input portion 29, and receives image formation setting performed by a selection operation on the imaged image forming apparatus 7, on the screen of the display operation portion 13.

In the present embodiment, for example, as shown in FIGS. 3(A) to (C), the sheet feed source 37 and the sheet discharge destination 39 are designated by tapping, the number of copies for image formation is designated by tapping the image forming apparatus 7 itself, and the designated number of copies is changed by vertically flicking the image forming apparatus 7 itself.

The image formation setting thus received is stored in the RAM or the like of the terminal storage portion 19 by the terminal control portion 17 of the mobile terminal 3 acting as the image formation instructing portion 30. Thus, step S6 is completed, and the processing shifts to step S7.

In step S7, "reception of image formation instruction" is performed. In step S7, first, the terminal control portion 17 of the mobile terminal 3 acts as the icon display portion 27, and displays an icon 41 of data of an image formation object shown in FIG. 4 so as to be movable, on the screen of the display operation portion 13, through a menu operation or the like.

Then, the terminal control portion 17 of the mobile terminal 3 acts as the operation input portion 29, and allows a selection operation of overlapping the icon 41 with the image forming apparatus 7 by dragging and dropping the icon 41 on the screen of the display operation portion 13. Thereby, the operation input portion 29 allows an instruction of image formation of the data corresponding to the icon 41.

Thus, step S7 is completed, and the processing shifts to step S8.

In step S8, "execution of image formation instruction" is performed. In step S8, the terminal control portion 17 of the mobile terminal 3 acts as the image formation instructing portion 30, and executes the image formation instruction based on the image formation setting stored in step S5 and the data corresponding to the icon 41. The executed image formation instruction is transmitted to the image forming apparatus 7 via the network 9.

In the image forming apparatus 7, the apparatus control portion 55 acts as the image formation control portion 61, and generates image formation data to be output, based on the received image formation instruction. Thereafter, the image forming portion 53 performs image formation on paper sheets according to the image formation data.

[Effect of the Embodiment]

In the conventional mobile terminal, since an image of an operation panel of an image forming apparatus is displayed on a screen of the mobile terminal, the operability for an operation input on the mobile terminal is equivalent to the operability for an operation input on the operation panel of the image forming apparatus. Therefore, in the conventional mobile terminal, AR is not effectively used for the operation input on the screen of the mobile terminal, and an intuitive operation input cannot be performed. In other words, in the conventional mobile terminal, an intuitive operation input cannot be performed to the imaged image forming apparatus.

In contrast, as described above, the mobile terminal 3 of the present embodiment includes the imaging mechanism 11, the apparatus identifying portion 23, the apparatus recognizing portion 24, the display portion 25, and the operation input portion 29 that receives an operation input.

Accordingly, the mobile terminal 3 of the present embodiment allows a selection operation on the imaged image forming apparatus 7 on the screen of the display operation portion 13, and thus the user can intuitively perform an operation input to the image forming apparatus 7.

Further, the mobile terminal 3 of the present embodiment includes the icon display portion 27 that displays the icon 41 of data of an image formation object so as to be movable, on the screen of the display operation portion 13. The operation input portion 29 allows an input of a selection operation of overlapping the icon 41 with the image forming apparatus on the screen of the display operation portion 13, and receives an operation input for an instruction of image formation based on the data corresponding to the icon 41.

Accordingly, in the mobile terminal 3 of the present embodiment, an image formation instruction to the imaged image forming apparatus 7 can be easily and reliably performed by an intuitive operation.

In the mobile terminal 3 of the present embodiment, the operation input portion 29 receives different operation inputs according to different selection operations performed to the imaged image forming apparatus 7, and therefore, more detailed operation inputs can be performed. As a result, image formation setting can also be realized by an intuitive operation.

In the mobile terminal 3 of the present embodiment, the display portion 25 adds objects to a plurality of portions of the image forming apparatus 7 having different functions, and the operation input portion 29 receives an operation input of a combination of different functions through an operation of selecting some of the plurality of portions.

Accordingly, in the mobile terminal 3, more detailed operation input can be performed, and thus image formation setting by an intuitive operation can be realized more reliably.

The apparatus identifying portion 23 includes the location specifying portion 31 that specifies the location of the mobile terminal 3, the direction specifying portion 33 that specifies the direction of the mobile terminal 3, and the apparatus specifying portion 35 that acquires the apparatus location/direction information (at least the location information) of the image forming apparatus 7, and specifies the imaged image forming apparatus 7 based on the location information and the direction information of the mobile terminal 3 as well as the acquired apparatus location/direction information of the image forming apparatus 7.

Accordingly, the mobile terminal 3 of the present embodiment can reliably specify the image forming apparatus 7 that the mobile terminal 3 images.

In the image forming system 1 having the mobile terminal 3 and the image forming apparatus 7, it is possible to easily and reliably execute an image formation instruction to the image forming apparatus 7 through an intuitive operation input to the image forming apparatus 7 on the mobile terminal 3.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An operation input apparatus, comprising:
   an imaging portion that is able to image an image forming apparatus installed in an installation location;
   an apparatus identifying portion that identifies the image forming apparatus imaged by the imaging portion, based on specific identification information;
   a recognizing portion that recognizes and specifies the image forming apparatus and a plurality of portions of the image forming apparatus corresponding to different functions thereof, by image recognition of the imaged image forming apparatus, according to the identification by the apparatus identifying portion;
   a display portion having a screen, that adds selection enabling information to each of the imaged image forming apparatus and the portions and displays the imaged image forming apparatus and the portions with the selection enabling information on the screen in such a way that the imaged image forming apparatus and the portions are selectable, the selection enabling information enabling a selection operation to the imaged image forming apparatus and the portions specified by the recognizing portion; and
   an operation input portion that receives an operation input to the image forming apparatus or the portions, through a selection operation performed on the image forming apparatus or the portions on the screen.

2. The operation input apparatus according to claim 1, further comprising:
   an icon display portion that displays, on the screen, an icon indicating data of an image formation object so as to be movable, wherein
   when input of the selection operation is performed by overlapping the icon with the image forming apparatus on the screen, the operation input portion receives an operation input of an instruction for image formation based on the data.

3. The operation input apparatus according to claim 1, wherein the operation input portion receives different operation inputs according to different selection operations.

4. The operation input apparatus according to claim 1, wherein
   the operation input portion receives an operation input of a combination of some of the different functions through an operation of selecting some of the plurality of portions on the screen.

5. The operation input apparatus according to claim 1, wherein the apparatus identifying portion comprises:
   a location specifying portion that specifies a location of the operation input apparatus itself;
   a direction specifying portion that specifies a direction of the operation input apparatus itself; and
   an apparatus specifying portion that acquires location information of the image forming apparatus, and specifies the imaged image forming apparatus, based on the location and the direction of the operation input apparatus itself as well as the acquired location information of the image forming apparatus.

6. An image forming system including the operation input apparatus according to claim 1, and an image forming apparatus as an object to be imaged by the operation input apparatus.

7. The operation input apparatus according to claim 1, wherein
   the operation input portion receives an operation input through a tapping operation performed on any of the plurality of portions of the image forming apparatus displayed on the screen.

8. The operation input apparatus according to claim 1, wherein
   the operation input portion receives an operation input for designating the number of copies for image formation by the image forming apparatus, through a selection operation performed on the image forming apparatus displayed on the screen.

9. The operation input apparatus according to claim 8, wherein
   the operation input portion receives an operation input for designating the number of copies for image formation by the image forming apparatus, through a tapping operation performed on the image forming apparatus displayed on the screen, and receives an operation input for increasing or decreasing the number of copies that has already been designated, through a flicking operation performed on the image forming apparatus displayed on the screen.

10. A non-transitory computer-readable storage medium in which an operation input program is stored, the operation input program causing a computer to realize:

an imaging function capable of imaging an image forming apparatus installed in an installation location;

an apparatus identifying function of identifying the image forming apparatus imaged by the imaging function, based on specific identification information;

a recognizing function of recognizing and specifying the image forming apparatus and a plurality of portions of the image forming apparatus corresponding to different functions thereof, by image recognition of the imaged image forming apparatus, according to the identification by the apparatus identifying function;

a display function of adding selection enabling information to each of the imaged image forming apparatus and the portions and displaying the imaged image forming apparatus and the portions with the selection enabling information on a screen in such a way that the imaged image forming apparatus and the portions are selectable, the selection enabling information enabling a selection operation to the image forming apparatus and the portions specified by the recognizing function; and an operation input function of receiving an operation input to the image forming apparatus or the portions, through a selection operation performed on the image forming apparatus or the portions on the screen.

11. The storage medium according to claim 10, wherein the operation input function receives an operation input, through a tapping operation performed on any of the plurality of portions of the image forming apparatus displayed on the screen.

12. The storage medium according to claim 10, wherein the operation input function receives an operation input for designating the number of copies for image formation by the image forming apparatus, through a selection operation performed on the image forming apparatus displayed on the screen.

13. The storage medium according to claim 12, wherein the operation input function receives an operation input for designating the number of copies for image formation by the image forming apparatus, through a tapping operation performed on the image forming apparatus displayed on the screen, and receives an operation input for increasing or decreasing the number of copies that has already been designated, through a flicking operation performed on the image forming apparatus displayed on the screen.

14. An operation input apparatus, comprising:
an imaging portion that is able to image an image forming apparatus installed in an installation location;
an apparatus identifying portion that identifies the image forming apparatus imaged by the imaging portion, based on specific identification information;
a recognizing portion that recognizes and specifies the image forming apparatus by image recognition of the imaged image forming apparatus according to the identification by the apparatus identifying portion;
a display portion having a screen, that adds selection enabling information to the imaged image forming apparatus and displays the imaged image forming apparatus with the selection enabling information on the screen in such a way that the imaged image forming apparatus is selectable, the selection enabling information enabling a selection operation to the image forming apparatus specified by the recognizing portion; and
an operation input portion that receives an operation input for designating the number of copies for image formation by the image forming apparatus, through a selection operation performed on the image forming apparatus on the screen.

15. The operation input apparatus according to claim 14, wherein
the operation input portion receives an operation input for designating the number of copies for image formation by the image forming apparatus, through a tapping operation performed on the image forming apparatus displayed on the screen, and receives an operation input for increasing or decreasing the number of copies that has already been designated, through a flicking operation performed on the image forming apparatus displayed on the screen.

16. A non-transitory computer-readable storage medium in which an operation input program is stored, the operation input program causing a computer to realize:
an imaging function capable of imaging an image forming apparatus installed in an installation location;
an apparatus identifying function of identifying the image forming apparatus imaged by the imaging function, based on specific identification information;
a recognizing function of recognizing and specifying the image forming apparatus by image recognition of the imaged image forming apparatus according to the identification by the apparatus identifying function;
a display function of adding selection enabling information to the imaged image forming apparatus and displaying the imaged image forming apparatus with the selection enabling information on a screen in such a way that the imaged image forming apparatus is selectable, the selection enabling information enabling a selection operation to the image forming apparatus specified by the recognizing function; and
an operation input function of receiving an operation input for designating the number of copies for image formation by the image forming apparatus, through a selection operation performed on the image forming apparatus on the screen.

17. The storage medium according to claim 16, wherein
the operation input function receives an operation input for designating the number of copies for image formation by the image forming apparatus, through a tapping operation performed on the image forming apparatus displayed on the screen, and receives an operation input for increasing or decreasing the number of copies that has already been designated, through a flicking operation performed on the image forming apparatus displayed on the screen.

\* \* \* \* \*